US012164262B2

(12) United States Patent
Tanabe

(10) Patent No.: US 12,164,262 B2
(45) Date of Patent: Dec. 10, 2024

(54) IMAGE FORMING APPARATUS INCLUDING PARTICULARLY ARRANGED DRIVING MECHANISM

(71) Applicant: CANON KABUSHIKI KAISHA, Tokyo (JP)

(72) Inventor: Yuichi Tanabe, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/334,607

(22) Filed: Jun. 14, 2023

(65) Prior Publication Data

US 2024/0045370 A1 Feb. 8, 2024

(30) Foreign Application Priority Data

Aug. 8, 2022 (JP) ................................ 2022-126125

(51) Int. Cl.
*G03G 21/16* (2006.01)
*G03G 21/18* (2006.01)

(52) U.S. Cl.
CPC ....... *G03G 21/186* (2013.01); *G03G 21/1647* (2013.01); *G03G 2221/1657* (2013.01)

(58) Field of Classification Search
CPC ............ G03G 15/757; G03G 21/1647; G03G 21/168; G03G 21/185; G03G 21/186; G03G 2221/1657
See application file for complete search history.

(56) References Cited

U.S. PATENT DOCUMENTS

| | | | | |
|---|---|---|---|---|
| 7,120,376 | B2 | 10/2006 | Saito et al. | |
| 2016/0187841 | A1* | 6/2016 | Hatano | G03G 21/168<br>399/121 |
| 2022/0342361 | A1* | 10/2022 | Tanabe | G03G 21/168 |

FOREIGN PATENT DOCUMENTS

| | | | |
|---|---|---|---|
| JP | 2001134029 | A | 5/2001 |
| JP | 4194439 | B2 | 12/2008 |

* cited by examiner

*Primary Examiner* — Sophia S Chen
(74) *Attorney, Agent, or Firm* — ROSSI, KIMMS & McDOWELL LLP

(57) ABSTRACT

Disclosed is an image forming apparatus including a detachable unit having a rotator with a driven shaft coupling and a drive unit having a drive shaft coupling to engage with the driven shaft coupling and providing a force to the rotator via the drive shaft coupling. The driven shaft coupling includes spiral first and second receiving surfaces. The drive side shaft coupling includes a spiral first transmitting surface, which contacts the first receiving surface and provides a rotational force in a first rotational direction to the driven shaft coupling, and a spiral second transmitting surface, which contacts the second receiving surface and provides a force in the second rotational direction opposite to the first rotational direction to the driven shaft coupling when the drive shaft coupling rotates in the second rotating direction. The second transmitting and receiving surfaces are rougher than the first transmitting and receiving surfaces.

10 Claims, 11 Drawing Sheets

231
232
250(252)
A
A
225k
224k
227k
200
226k
224c
225c
226c
227c
224m
225m
227m
226m
224y
226y
250(251)
225y
227y 260
261
251(250)
262
231
252(250)
254
253
232
A-A ENLARGED CROSS
-SECTIONAL VIEW

IMAGE FORMING APPARATUS INCLUDING PARTICULARLY ARRANGED DRIVING MECHANISM

BACKGROUND OF THE INVENTION

Field of the Invention

This invention relates to an image forming apparatus equipped with a drive unit that provides a driving force to a rotating member.

Description of the Related Art

In recent years, an image forming apparatus such as a coping machine and a printer is used, which has a rotating member such as a photosensitive drum that can be inserted and removed. Further, in such an image forming apparatus, a shaft coupling is provided on the rotating member and a drive unit with a driving source that gives a driving force to the rotating member is arranged on the side of the image forming apparatus.

Japanese Patent Application Laid-open No. 2001-134029 discloses a configuration in which a shaft coupling has a twisted polygonal prism shape to provide a strong drive coupling between a rotating member and a drive unit.

In addition, Japanese Patent No. 4194439 discloses a configuration in which a rotating member is rotated in the opposite direction of the forward rotation direction during image formation, for example, to remove toner that has accumulated at the tip of a cleaning blade before it agglomerates.

In the above drive configuration, shaft couplings are generally manufactured by resin injection molding because of their light weight, low noise, and high productivity. Undercut processing is necessary when producing a shaft coupling with a twisted shape by injection molding. As a result, either one of a drive transmitting surface of the shaft coupling during the forward rotation and a drive transmitting surface of the shaft coupling during the reverse rotation will have an inclination that causes a force to act in the direction separating away from each other during rotation.

In such a configuration, a driving force may not be transmitted stably from the drive unit to the rotating member due to the inclination of the drive transmitting surfaces, with which a force acts in the direction separating away from each other during either the forward or the reverse rotation of the shaft coupling.

SUMMARY OF THE INVENTION

A representative configuration of the present invention is an image forming apparatus comprising:

- a detachably attachable unit that is detachably attachable to the image forming apparatus, the detachably attachable unit including a rotating member with a driven side shaft coupling; and
- a drive unit having a drive side shaft coupling to engage with the driven side shaft coupling, the drive unit being configured to provide a driving force to the rotating member via the drive side shaft coupling,
- wherein the driven side shaft coupling includes:
  - a first receiving surface in a spiral shape inclined in a direction that intersects an axial direction, the first receiving surface being configured to receive a rotating force in a first rotational direction from the drive side shaft coupling when the drive side shaft coupling rotates in the first rotational direction, the first rotational direction being a rotational direction during image formation; and
  - a second receiving surface in a spiral shape inclined in a direction that intersects an axial direction, the second receiving surface being configured to receive a rotating force in a second rotational direction from the drive side shaft coupling when the drive side shaft coupling rotates in the second rotational direction, the second rotational direction being opposite the first rotational direction,
- wherein the drive side shaft coupling includes:
  - a first transmitting surface in a spiral shape inclined in a direction that intersects an axial direction, the first transmitting surface being configured to contact the first receiving surface, to provide a rotational force in the first rotational direction to the driven side shaft coupling, and to receive a force in an axial direction contacting the first receiving surface when the drive side shaft coupling rotates in the first rotating direction; and
  - a second transmitting surface in a spiral shape inclined in a direction that intersects an axial direction, the second transmitting surface being configured to contact the second receiving surface, to provide a rotational force in the second rotational direction to the driven side shaft coupling, and to receive a force in an axial direction separating from the second receiving surface when the drive side shaft coupling rotates in the second rotating direction, and
- wherein the second transmitting surface and the second receiving surface are rougher than the first transmitting surface and the first receiving surface.

Further features of the present invention will become apparent from the following description of exemplary embodiments with reference to the attached drawings.

DESCRIPTION OF THE EMBODIMENTS

Hereinafter, with reference to the drawings, preferred embodiments of the present invention will be described in detail. However, the dimensions, materials, shapes, and relative arrangement of the components described in the following embodiments should be changed as appropriate depending on the configuration and various conditions of the device to which the invention is applied, and it is not intended to limit the scope of the invention to them alone.

<Image Forming Apparatus>

Figure 1:
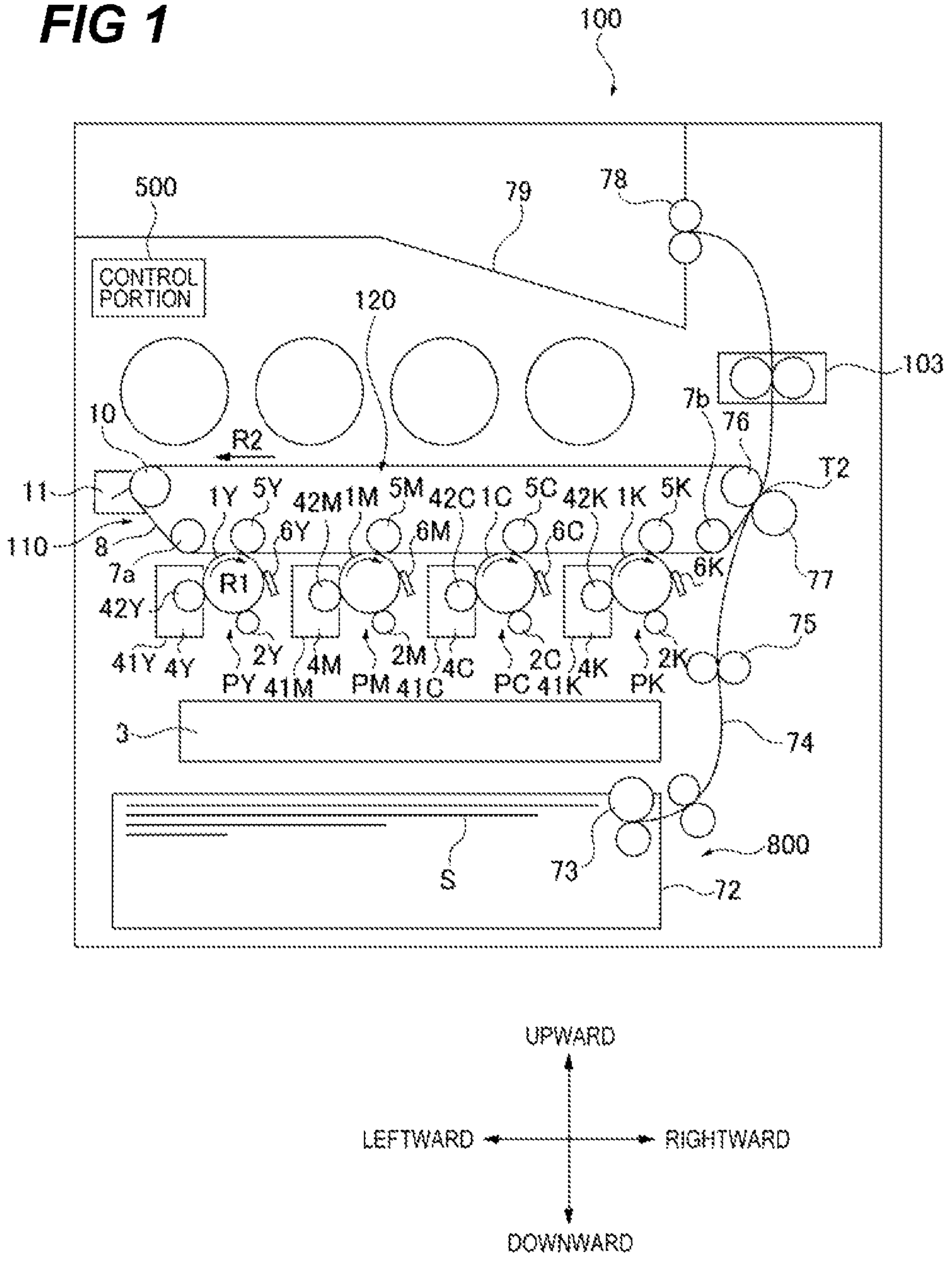
FIG. 1 is a schematic diagram showing the configuration of an image forming apparatus of an embodiment of the present invention.

The image forming apparatus of the present embodiment will be described using FIG. 1. FIG. 1 is a schematic diagram showing the configuration of the image forming apparatus of an embodiment of the present invention.

The image forming apparatus 100 shown in FIG. 1 is a color image forming apparatus of the intermediate transfer tandem type, in which image forming portions PY, PM, PC, and PK for four colors (yellow, cyan, magenta, and black) are arranged facing the intermediate transfer belt 8 in the apparatus main body. As recording materials S that can be used in the image forming apparatus 100, various types of sheet materials, such as plain paper, thick paper, rough paper, uneven paper, coated paper, OHP sheets, plastic film, cloth, etc. are used. The image forming apparatus 100 is controlled by the control portion 500.

The image forming apparatus 100 has the image forming portions PY to PK that form toner images on the photosensitive drum 1, the intermediate transfer unit 110 having the intermediate transfer belt 8 that bears the toner images formed on the photosensitive drum 1, and the sheet feeding portion 800 that feeds the recording materials S. In the present embodiment, the image forming unit 120, which forms a toner image on the recording material S, includes the image forming portions PY to PK, the primary transfer rollers 5Y to 5K, the intermediate transfer belt 8, the secondary transfer inner roller 76, and the secondary transfer outer roller 77. The intermediate transfer unit 110 includes the intermediate transfer belt 8, which is an endless belt, the tension roller 10 that stretches the intermediate transfer belt 8, the secondary transfer inner roller 76, and the idler rollers 7*a* and 7*b*. The sheet feeding portion 800 includes the cassette 72, the sheet feeding roller 73, the conveying path 74, and the registration roller 75.

Figure 2:
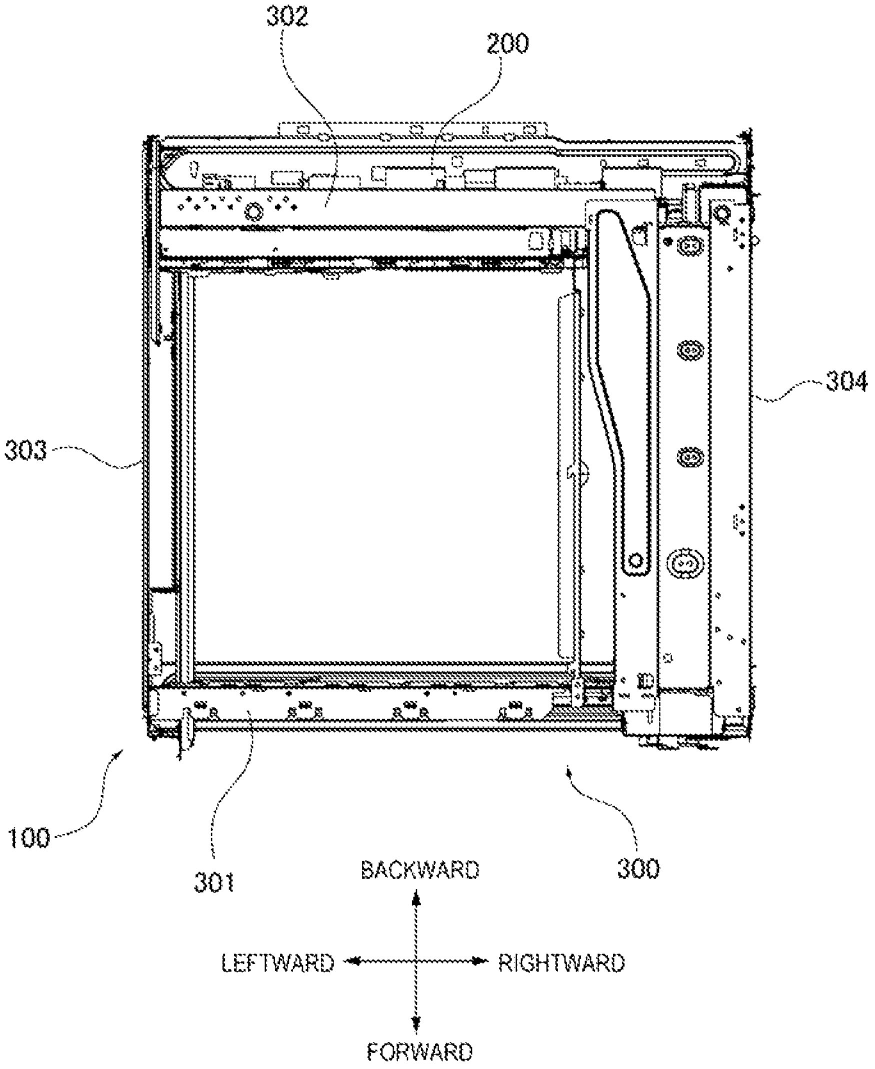
FIG. 2 is a diagram showing the positional relationship between a base frame and a drive unit.

The image forming apparatus 100 has the base frame 300 as the main frame, as shown in FIG. 2. The base frame 300 includes the front base frame 301, the back base frame 302, the left base frame 303 and the right base frame 304.

The front base frame 301 is located on the front side in the front-back direction of the image forming apparatus 100, and the back base frame 302 is located on the back side of the image forming apparatus 100. The back base frame 302 is located opposite the front base frame 301 in the front-back direction.

The left base frame 303 is located on the left side in the left-right direction orthogonal to the front-back direction of the image forming apparatus 100, and the right base frame 304 is located on the right side of the image forming apparatus 100. The right base frame 304 is positioned opposite the left base frame 303 in the left-right direction. The left base frame 303 and the right base frame 304 are attached to the front base frame 301 and the back base frame 302, respectively.

Figure 3A:
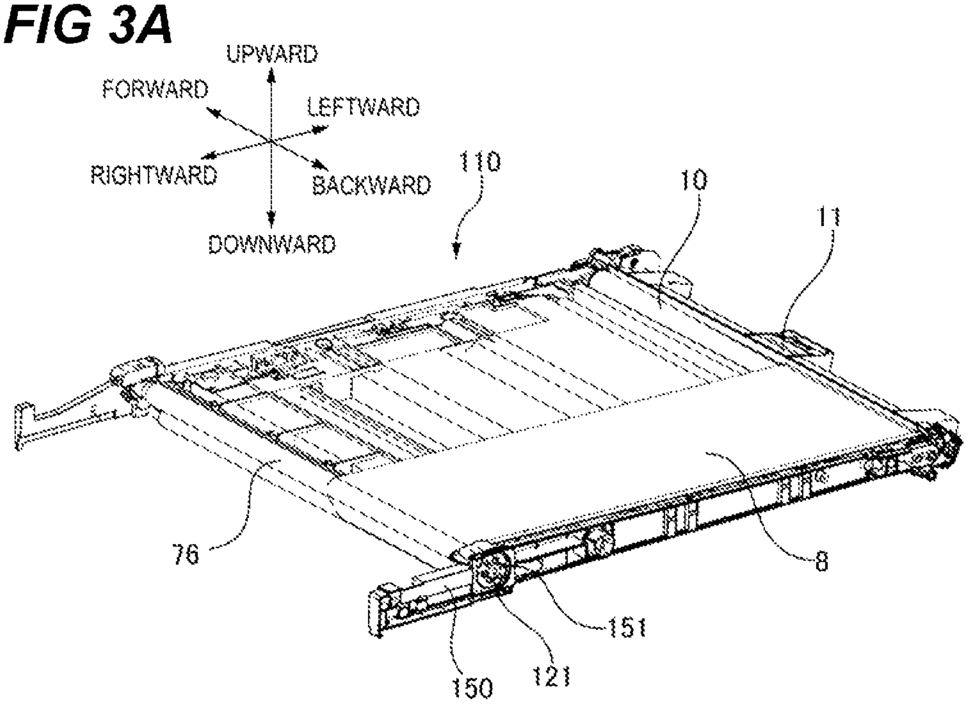
FIGS. 3A and 3B are diagrams showing insertion and removal of an intermediate transfer unit to and from the image forming apparatus.
Figure 3B:
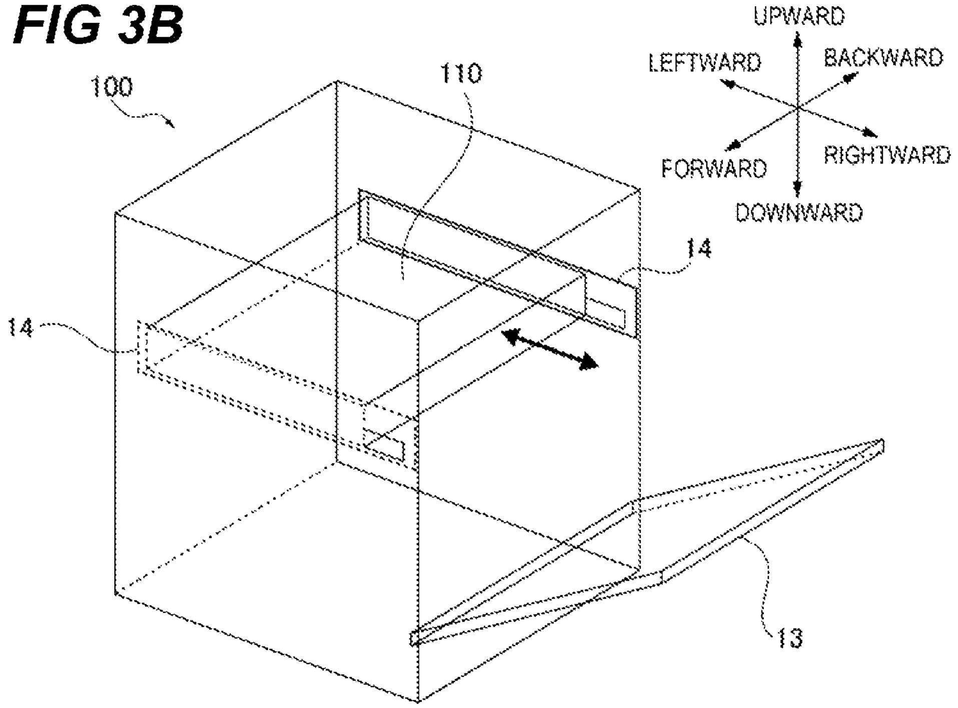
Figure 4A:
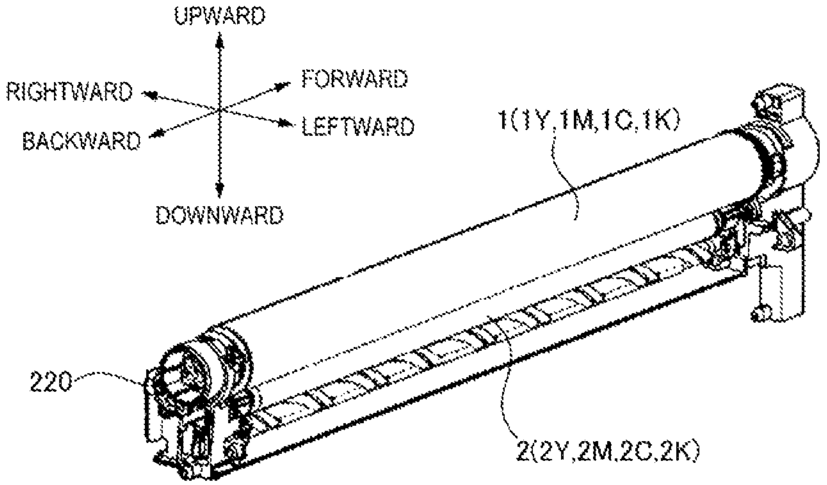
FIGS. 4A and 4B are diagrams showing insertion and removal of a photosensitive drum to and from the image forming apparatus.
Figure 4B:
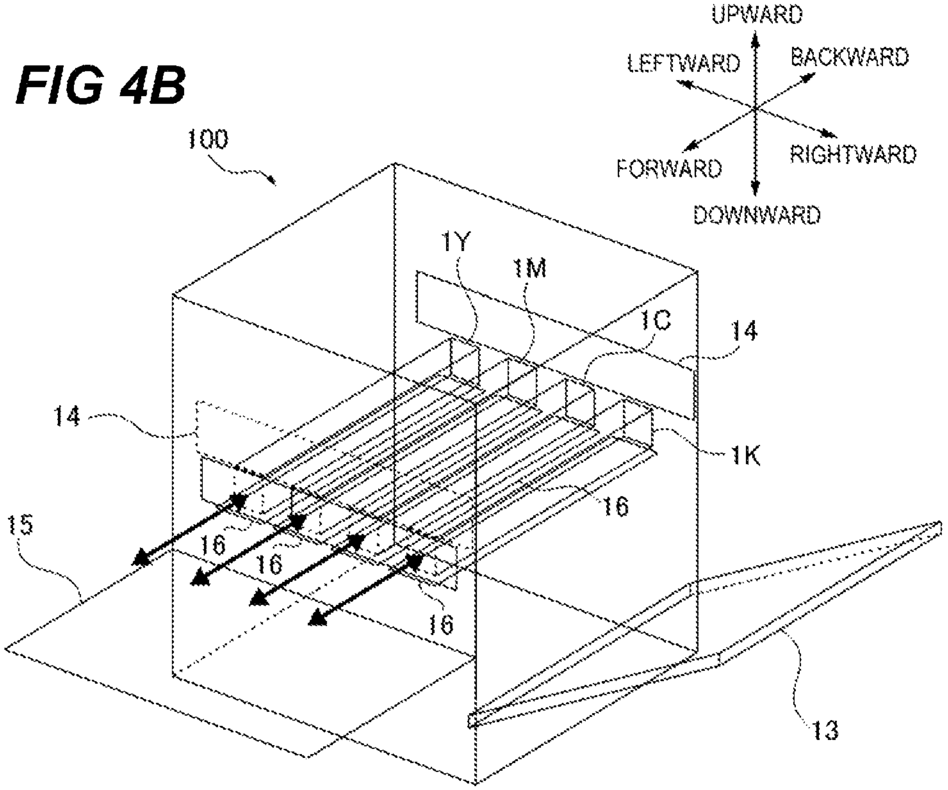

In the following description, the front side is defined as the front base frame 301 side and the back side is defined as the back base frame 302 side in the image forming apparatus 100. Similarly, the left side is defined as the left base frame 303 side and the right side is defined as the right base frame 304 side in the image forming apparatus 100. Namely, the left side is defined as the side where the image forming portion PY, which forms a yellow toner image, is located with respect to the image forming portion PK, which forms a black toner image. Further, the right side is defined as the side where the image forming portion PK, which forms a black toner image, is located with respect to the image forming portion PY, which forms a yellow toner image. Furthermore, the upward direction is defined as the vertical upward direction perpendicular to the front-back direction and the left-right direction defined above and the downward direction is defined as the vertical downward direction perpendicular to the front-back direction and the left-right direction defined above. The defined forward, backward, rightward, leftward, upward and downward directions are shown in FIGS. 3 and 4.

The image forming portions PY to PK, the intermediate transfer unit 110, the sheet feeding portion 800, and so on are arranged in a space formed by the base frame 300. An exterior member (not shown) of the image forming apparatus 100 covers the outer circumference of the base frame 300 to suppress the sound generated when the image forming apparatus 100 operates from reaching the outside of the apparatus.

The image forming apparatus 100 includes the drive unit 200 that drives the image forming portions PY to PK and the intermediate transfer unit 110 to rotate. The drive unit 200 is arranged on the back surface of the image forming portions PY to PK and the intermediate transfer unit 110 via the back base frame 302. The drive unit 200 is attached to the back surface side of the back base frame 302, which will be described below.

A conveying process of the recording materials S of the image forming apparatus 100 will be described. The recording materials S are accommodated while being stacked in the cassette 72 and are fed one by one to the conveying path 74 by the sheet feeding roller 73 in accordance with image forming timing. Also, the recording materials S stacked on a manual feeding tray (not shown) or a stacking device may be fed to the conveying path 74 one by one. When the recording materials S are conveyed to the registration roller 75 arranged on the conveying path 74, the recording materials S are subjected to skew feeding correction and timing correction by the registration roller 75, and then sent to the secondary transfer portion T2. The secondary transfer portion T2 is a transfer nip formed by the secondary transfer inner roller 76 and the secondary transfer outer roller 77 facing each other. The toner image is secondarily transferred from the intermediate transfer belt 8 to the recording material S at the secondary transfer portion T2.

A process of forming an image sent to the secondary transfer portion T2 on the similar timing as the process of conveying the recording material S to the secondary transfer portion T2 will be described. First, the image forming portions PY to PK will be described. However, the image forming portions PY to PK are configured almost identically to each other except that the toner colors yellow, magenta, cyan, and black used in the developing devices 4Y, 4M, 4C and 4K respectively are different from each other. Therefore, the yellow imaging portion PY will be described below as a representative example, and descriptions will be omitted for the other imaging portions PM, PC and PK.

The image forming portion PY mainly includes the photosensitive drum 1Y as an image bearing member (rotating member), the charging device 2Y as process means acting on the photosensitive drum 1Y, the developing device 4Y, the photosensitive drum cleaner 6Y and so on. During image formation, the photosensitive drum 1Y is driven to rotate in the direction of arrow R1 (clockwise direction in FIG. 1) at a predetermined process speed (circumferential velocity). A charging voltage is applied to the charging device 2Y (charging roller) by a high-voltage power supply (not shown) so that an electric current flows between the charging device 2Y and the photosensitive drum 1Y. As a result, the surface of the photosensitive drum 1Y is uniformly charged to a specified potential with a specified polarity. After charging, an electrostatic latent image is formed on the photosensitive drum 1Y by exposure of the exposure device 3 based on image information. Toner adheres to this electrostatic latent image by the developing device 4Y so that the electrostatic latent image is developed as a toner image. The developing device 4Y has the developing container 41Y that contains developer, the developing roller 42Y (also called a developing sleeve) that bears developer and rotates. An electrostatic latent image is developed into a toner image when a developing voltage is applied to the developing roller 42Y. Thereafter, a predetermined pressure and a primary transfer voltage are applied by the primary transfer roller 5Y, which is positioned opposite the image forming portion PY via the intermediate transfer belt 8 so that the toner image formed on the photosensitive drum 1Y is primary transferred onto the intermediate transfer belt 8. The toner slightly remaining on the photosensitive drum 1Y after primary transfer is removed by the photosensitive drum cleaner 6Y to prepare for the next image generation process.

The intermediate transfer belt 8 is stretched by the tension roller 10, the secondary transfer inner roller 76, and the idler rollers 7*a* and 7*b* as tension rollers, and is driven to move in the direction of arrow R2 (counterclockwise direction in FIG. 1). In this embodiment, the secondary transfer inner roller 76 also serves as a drive roller (rotating member) that drives the intermediate transfer belt 8. The image creation process for each color processed by the image forming portions PY to PK described above is timed such that a created new toner image will be superimposed sequentially on the toner image of the color upstream in the conveying direction that has been primary transferred on the intermediate transfer belt 8. As a result, a full-color toner image is finally formed on the intermediate transfer belt 8 and is conveyed to the secondary transfer portion T2. The transfer cleaning device 11 removes transfer residual toner from the intermediate transfer belt 8 after passing through the secondary transfer portion T2.

With the conveying process and the image forming process described above, the recording material S and the full-color toner image arrive at the same timing at the secondary transfer portion T2, and the toner image is secondarily transferred from the intermediate transfer belt 8 to the recording material S. After that, the recording material S is conveyed to the fixing device 103 where the toner image is melted and fixed on the recording material S by being pressurized and heated by the fixing device 103. After the toner image is fixed in this way, the recording material S is discharged onto the discharge tray 79 by the discharge roller 78.

When the last recording material S is discharged and the print job is finished, the image forming apparatus transitions to the post-rotation process. In the post-rotation process, predetermined process members such as the intermediate transfer belt 8 and photosensitive drum 1 of the image forming apparatus are operated even after the print job is finished. In the present embodiment, the intermediate transfer belt 8 and photosensitive drum 1 are rotated in a reverse direction in the post-rotation process.

When the rotation in the first rotational direction (the arrow R2 direction in FIG. 1) of the intermediate transfer belt 8 during the image formation is referred to as a forward rotation, the reverse rotation of the intermediate transfer belt 8 is defined as the rotation in the second rotational direction, which is the opposite of the first rotational direction. When the rotation in the first rotational direction (the arrow R1 direction in FIG. 1) of the photosensitive drum 1 during the image formation is referred to as a forward rotation, the reverse rotation of the photosensitive drum 1 is defined as a rotation in the second rotational direction, which is the opposite of the first rotational direction.

By reversely rotating the intermediate transfer belt 8, paper dust and other foreign matter trapped between the intermediate transfer belt 8 and the transfer cleaning device 11 are moved to prevent image defects caused by poor cleaning performance. The photosensitive drum 1 is reversely rotated to break up the toner that has accumulated in the contact area between the photosensitive drum 1 and the photosensitive drum cleaner 6. This prevents an image defect caused by toner sticking to the surface of the photosensitive drum 1 after being left for a long period of time. In this embodiment, the amount of movement in the rotational direction of the intermediate transfer belt 8 and the photosensitive drum 1 due to the reverse rotation is a minute distance of about 30 mm.

<Insertion and Removal of Intermediate Transfer Unit>

Next, the insertion and the removal of the intermediate transfer unit 110 in this embodiment will be described with reference to FIGS. 3A and 3B. FIG. 3A is a schematic diagram showing a perspective view of the intermediate transfer unit 110. In FIG. 3A, a part of the front side of the intermediate transfer belt is shown as being cut away to better illustrate the configuration. FIG. 3B is a schematic diagram showing a perspective view of the intermediate transfer unit 110 in a state in which it is attached to the image forming apparatus.

The intermediate transfer unit 110, which is a detachably attachable unit, is supported by the image forming apparatus 100 in a removably insertable (detachably attachable) manner. In the intermediate transfer unit 110, the roller coupling 121, which is a driven side shaft coupling, is provided on the back side of the secondary transfer inner roller (drive roller) 76 to couple and decouple the driving force from the drive unit 200 during insertion and removal. The intermediate transfer unit 110, which is detachably attachable to the image forming apparatus 100, has the secondary transfer inner roller (drive roller) 76, which is a rotating member that drives the intermediate transfer belt 8. The secondary transfer inner roller 76 has the roller coupling 121, which is a driven side shaft coupling. In this embodiment, the roller coupling 121 is manufactured by resin injection molding using an injection molding die. In the vicinity of the roller coupling 121 of the intermediate transfer unit 110, a release member 150 is provided. The release member can retract the intermediate transfer drive coupling 232 (see FIG. 8), which is a drive side shaft coupling of the drive unit 200 described below, in the thrust direction, which is an axial direction. The intermediate transfer drive coupling 232 is integrally formed with the intermediate transfer drive gear 331 of the intermediate transfer unit 110 described below.

The image forming apparatus 100 has the right door 13 that opens and closes the right side of the image forming apparatus 100 so as to divide the conveying path of the recording material S from the sheet feeding roller 73 to the fixing unit 103. The insertion and the removal of the intermediate transfer unit 110 is performed with the right door 13 being opened. To remove the intermediate transfer unit 110 from the image forming apparatus 100, by operating the release member 150, the intermediate transfer drive coupling 332 of the drive unit 200 is retracted from the roller coupling 121, and then the intermediate transfer unit 110 is pulled to the right side of the image forming apparatus 100. Conversely, the intermediate transfer unit 110 can be attached to the image forming apparatus 100 by pushing the intermediate transfer unit 110 to the left side of the image forming apparatus 100. The rails 14 for supporting the intermediate transfer unit 110 are attached to the image forming apparatus 100. The intermediate transfer unit 110 is guided by the rails 14 and can be moved in the left-right direction (substantially horizontal direction) perpendicular to the front-back direction of the image forming apparatus 100 to be inserted into and removed from the image forming apparatus 100.

<Insertion and Removal of Photosensitive Drum>

Next, the insertion and the removal of the photosensitive drum in this embodiment will be described with reference to FIGS. 5A and 5B. FIG. 5A is a schematic diagram showing a perspective view of the photosensitive drum 1. FIG. 5B is a schematic diagram showing a perspective view of the photosensitive drum 1 in a state in which it is attached to the image forming apparatus 100.

The photosensitive drums 1 are a detachably attachable unit similarly to the intermediate transfer unit 110 and are supported by the image forming apparatus 100 in a removably insertable (detachably attachable) manner. The drum couplings 220, which are driven side shaft couplings, are provided on the back sides of the photosensitive drums 1 to couple and decouple the driving force from the drive unit 200 during insertion and removal. The photosensitive drums 1 (1Y, 1M, 1C and 1K), which are detachably attachable to the image forming apparatus 100, have the drum couplings 220, which are driven side shaft couplings. In this embodiment, the drum couplings 220 are manufactured by the resin injection molding using an injection molding die.

The insertion and the removal of the photosensitive drums 1 is performed with the front door 15 being opened, which is provided on the front side of the image forming apparatus 100. To remove the photosensitive drums 1 from the image forming apparatus 100, the photosensitive drums 1 are pulled to the front side of the image forming apparatus 100. Conversely, the photosensitive drums 1 can be attached to the image forming apparatus 100 by pushing the photosensitive drums 1 to the back side of the image forming apparatus 100. The drum rails 16 for supporting the photosensitive drums 1 are attached to the image forming apparatus 100. The photosensitive drums 1 are guided by the drum rails 16 and can be moved in the front-back direction (substantially horizontal direction) to be inserted into and removed from the image forming apparatus 100.

<Configuration for Mounting Drive Unit>

Next, how the drive unit 200 is attached to the base frame 300 will be described using FIG. 2.

FIG. 2 is a schematic diagram showing the base frame 300 on which the drive unit 200 is mounted, which is viewed from the top. The illustrations for other units attached to the base frame 300 are omitted in FIG. 2. The front base frame 301 is located on the front side in the front-back direction of the image forming apparatus 100, and the back base frame 302 is located on the back side. The back base frame 302 is positioned opposite the front base frame 301, and the left base frame 303 and the right base frame 304 are configured to be attached to the front base frame 301 and the back base frame 302, respectively. The drive unit 200 is positioned behind the image forming unit 120 and attached to the back base frame 302 of the apparatus main body.

<Configuration of Drive Unit>

Figure 5:
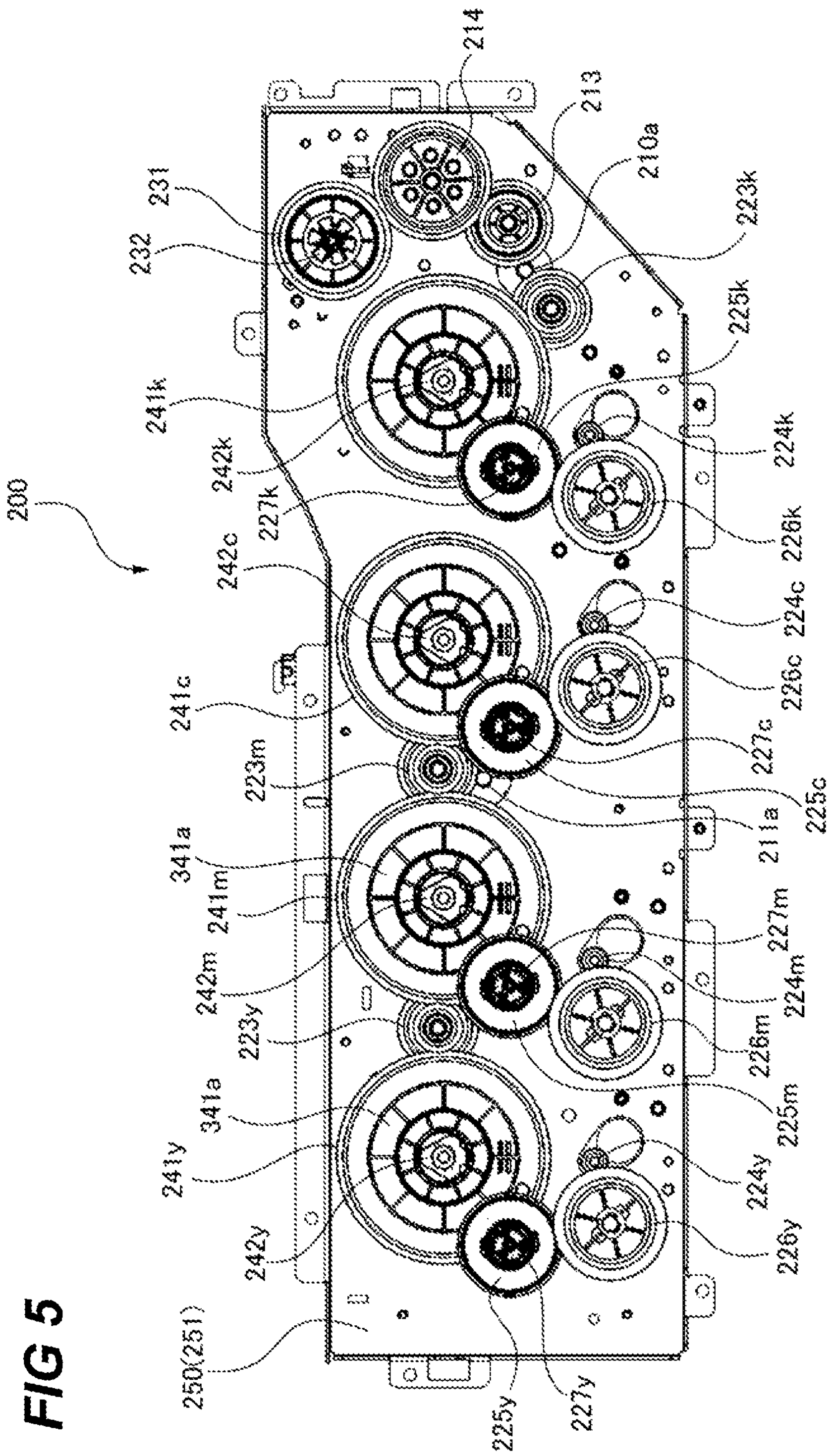
FIG. 5 is a diagram showing a front view of the drive unit.
Figures 6A, 6B:
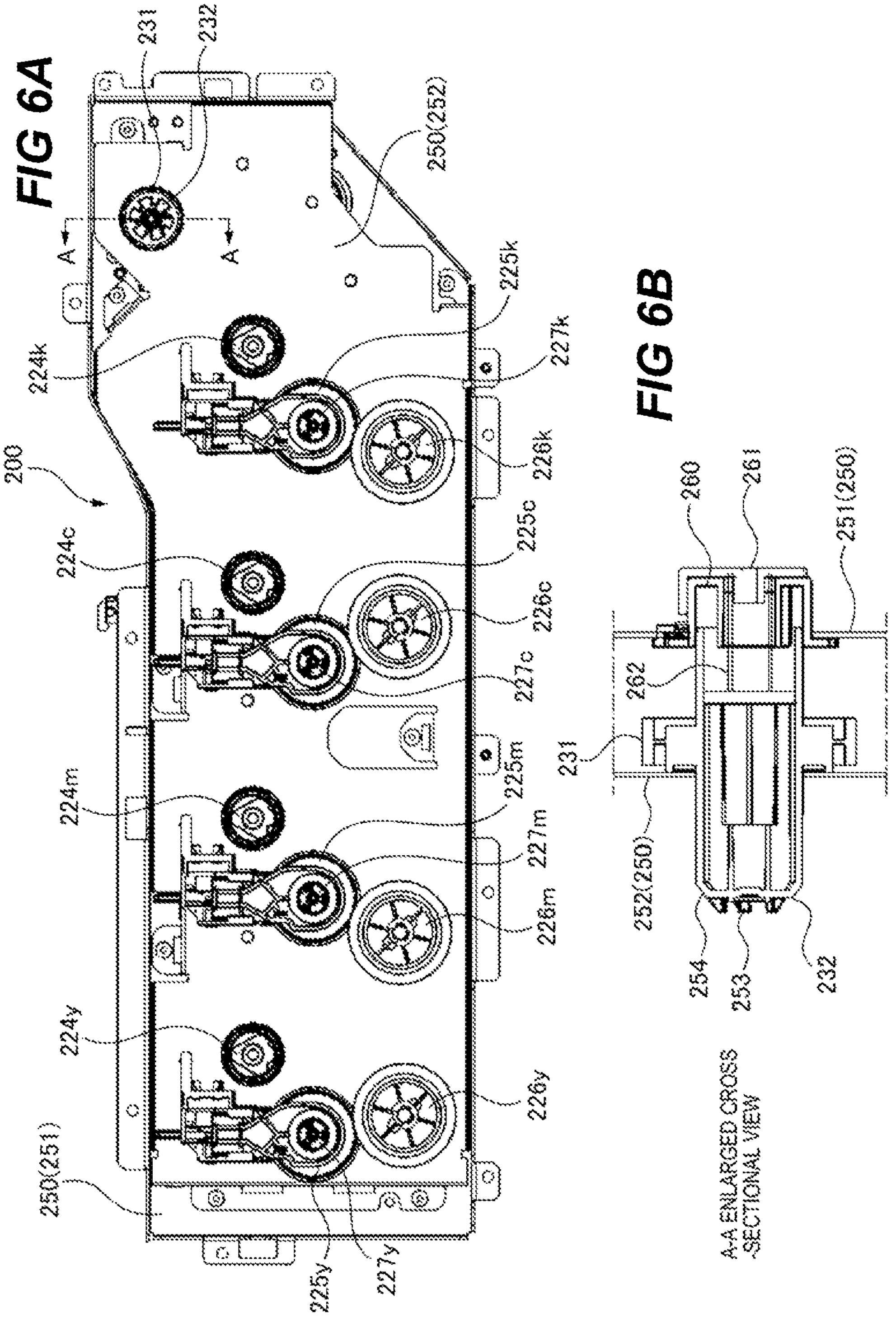
FIG. 6A is a diagram showing a front view of the drive unit.
FIG. 6B is a diagram showing a sectional view of the configuration of a drive gear and a holding member.
Figure 7:
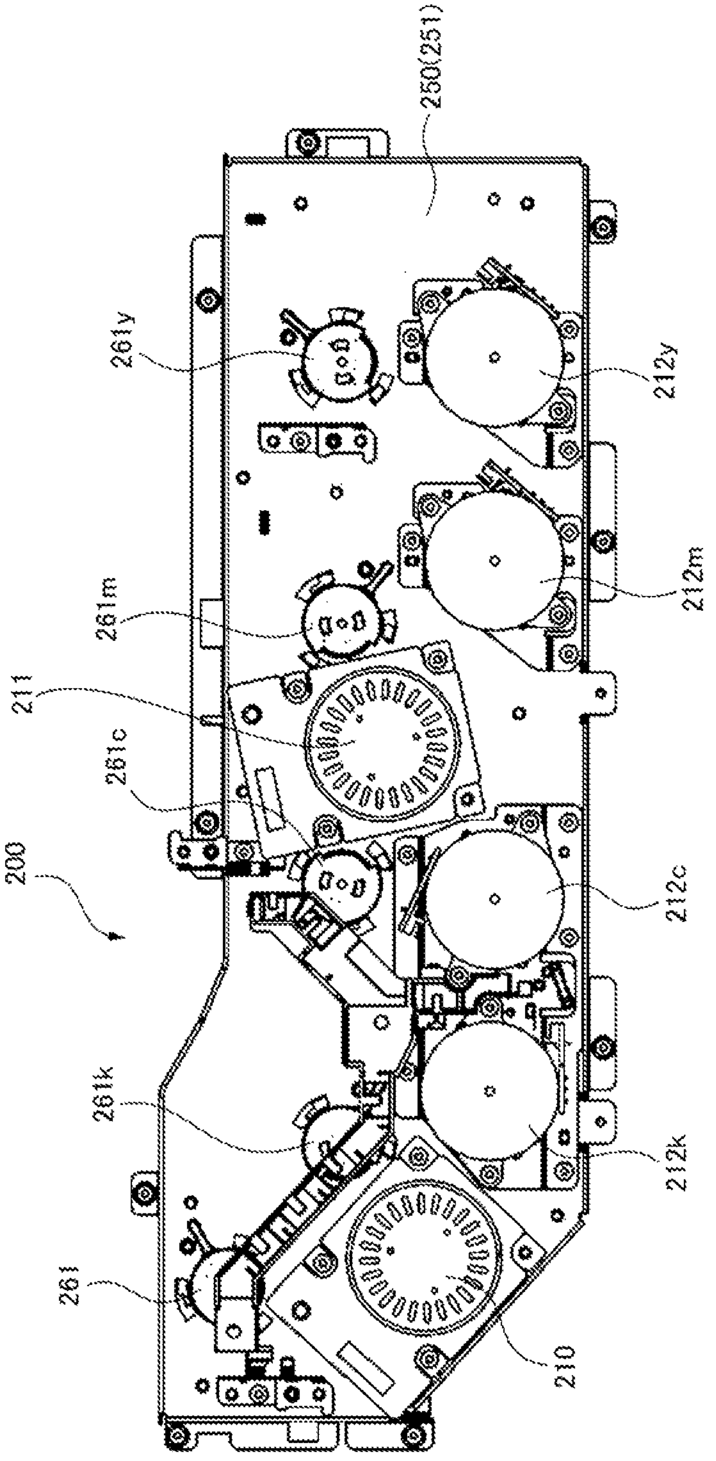
FIG. 7 is diagram showing a back view of the drive unit.

Next, the configuration of the drive unit in this embodiment will be described using FIGS. 5, 6 and 7. FIG. 5 is a front view of the drive unit and shows the gear rows in the drive unit. FIG. 6A is a back view of the drive unit, and FIG. 6B is a cross-sectional view showing the configuration for holding the drive gear. FIG. 7 is a back view of the drive unit.

The drive unit 200 includes the belt drum motor 210, the color drum motor 211 and the developing motors 212*y*, 212*m*, 212*c* and 212*k* for respective colors. The belt drum motor 210, the color drum motor 211, and the developing motors 212*y*, 212*m*, 212*c* and 212*k* for respective colors are held by the drive frame 350 that constitutes a housing of the drive unit 200. The belt drum motor 210 is a driving source for rotating the secondary transfer inner roller 76 as a driving roller for rotating the intermediate transfer belt 8 and the photosensitive drum 1*k* for the color black. The color drum motor 211 is a driving source that drives the photosensitive drums 1*y*, 1*m* and 1*c* for the respective colors (yellow, magenta, and cyan). The development motor 212 for respective colors is the drive source that rotates and drives the development rollers 42 of respective colors (yellow, magenta, cyan and black), respectively. These motors 210, 211 and 212 are generally used at 1000 to 3000 rpm from a standpoint of efficiency.

The drive unit 200 is equipped with the gears described below. These gears are held in the drive frame 250, which constitutes the housing of the drive unit 200.

The motor gear 210*a* coaxial with the belt drum motor 210 meshes with the belt reduction gear 213. The belt reduction gear 213 meshes with the idle gear 214. The idle gear 214 meshes with the intermediate transfer drive gear 231 coaxial with the secondary transfer inner roller 76. The speed of the rotation generated by the belt drum motor 210 is reduced by the gear ratio of the meshing gears 210*a*, 213, 214, and 231 as described above in order to drive the intermediate transfer belt 8 to rotate at the specified process speed.

The motor gear 210*a* coaxial with the belt drum motor 210 meshes with the drum reduction gear 223*k*. The drum reduction gear 223*k* meshes with the drum drive gear 241*k* coaxial with the photosensitive drum 1*k* for the color black. The speed of the rotation generated by the belt drum motor 210 is reduced by the meshing gears 210*a*, 223*k* and 241*k* as described above such that the photosensitive drum 1*k* for the color black rotates at a predetermined peripheral velocity ratio with respect to the intermediate transfer belt 8.

Further, the drum reduction gear 223*m* is arranged between the drum drive gears 241*m* and 241*c* coaxial with the photosensitive drum 1*m* for the color magenta and the photosensitive drum 1*c* for the color cyan, respectively. The drum reduction gear 223*y* is arranged between the drum drive gears 241*y* and 241*m* coaxial with the photosensitive drum 1*y* for the color yellow and the photosensitive drum 1*m* for the color magenta, respectively. The motor gear 211*a* coaxial with the color drum motor 211 meshes with either the drum reduction gear 223*m* or the drum reduction gear 223*y*. Here, the motor gear 211*a* coaxial with the color drum motor 211 meshes with the drum reduction gear 223*m*. The drum reduction gear 223*m* meshes with the drum drive gear 241*c* and the drum drive gear 241*m*. The drum drive gear 241*m* meshes with the drum reduction gear 223*y*, and the reduction gear 223*y* meshes with the drum drive gear 241*y*. The color drum motor 211 transmits the drive force to the photosensitive drums 1*y*, 1*m*, and 1*c* for the colors yellow, magenta, and cyan by means of the gears 211*a*, 223*m*, 223*y*, 241*c*, 241*m*, and 241*y*, which mesh as described above to achieve the same number of rotations as those of the photosensitive drum 1*k* for the color black.

The intermediate transfer drive coupling 232 is integrally formed at the front shaft end of the intermediate transfer drive gear 231. The intermediate transfer drive coupling 232 is a drive side shaft coupling that engages with the roller coupling 121 (see FIG. 3) so that the driving force can be transmitted to the roller coupling 121. The roller coupling 121 is a driven side shaft coupling. In the present embodiment, the intermediate transfer drive gear 231 and the intermediate transfer drive coupling 332 are manufactured as an integral part by resin injection molding using an injection mold die.

The drum drive coupling 242*k* is integrally formed at the front shaft end of the drum drive gear 241*y* for the color black. The drum drive coupling 242*k* engages the drum coupling 220 (see FIG. 4) so that the driving force can be transmitted to the drum coupling 220. The drum coupling 220 is a driven side coupling. Similarly, the drum drive couplings 242*y*, 242*m* and 242*c* are integrally formed at the front shaft ends of the drum drive gears 241*y*, 241*m* and 241*c* for colors yellow, magenta, and cyan, respectively. The drum drive couplings 242*y*, 242*m* and 242*c* engage the drum coupling 220 so that the driving force can be transmitted to the drum coupling 220. In this embodiment, the drum drive gear 241 and the drum drive coupling 242 are manufactured as an integral part for each color by resin injection molding using an injection mold die.

The development motor gear 224*k* coaxial with the developing motor 212*k* for the color black meshes with the developing reduction gear 226*k*. The developing reduction gear 226*k* meshes with the developing drive gear 225*k* coaxial with a developing roller (not shown). The developing coupling 227*k* is arranged so as to be coaxial with the developing drive gear 225*k*. The developing coupling 227*k* engages with a shaft coupling (not shown) on the developing roller side so as to be able to transmit the driving force. The speed of the rotation generated by the developing motor 212*k* for the color black is reduced by the meshing gears 224*k*, 226*k* and 225*k* as described above such that the developing roller 42*k* for the color black rotates at a predetermined peripheral velocity ratio with respect to the photosensitive drum 1*k*.

The configuration for rotationally driving the developing rollers 42*y*, 42*m* and 42*c* for the colors yellow, magenta and cyan in the driving unit 200 is the same as the above-described configuration for rotationally driving the developing roller 42*k* for the color black, so the description thereof will be omitted.

The drive unit 200 includes the gears described above. Helical gears are used for these gears. Helical gears generate a thrust force Fg in the axial direction unlike spur gears, and have a higher meshing ratio, so that helical gears are effective in reducing uneven rotation and noise. In order to strengthen the driving coupling during image formation (forward rotation) between the detachably attachable unit (rotating member) of the image forming apparatus and the drive unit of the image forming apparatus, the intermediate transfer drive gear 231 and each of the drum drive gears 241 are configured as a helical gear described blow. In this embodiment, the twisting direction of the intermediate transfer drive gear 231 is left so that the intermediate transfer drive gear 231 generates a thrust force Fg in the direction toward the roller coupling 121 during forward rotation. Further, the twisting direction of the drum drive gear 341 is right so that the drum drive gear 241 generates a thrust force Fg in the direction toward the drum coupling 220 during forward rotation.

These gears are held by the drive frame 250 positioned and fixed to the base frame 300 of the image forming apparatus 100. The drive frame 250 is configured by the drive frame 251 at the back side and the drive frame 252 at the front side, arranged to face the drive frame 251 at the back side in the front-back direction. The drive frame 250 forms a box shape (housing) by fastening these drive frames 251 and 252 at a plurality of points. The intermediate transfer drive gear 231 and the drum drive gears 241*y*, 241*m*, 241*c* and 241*k* are rotatably held by the bearings 260 provided on the drive frame 251 on the back side. The holders 261 are provided in the bearings 260 and pressure members 262 are held in the holders 261. Although FIG. 6B shows only the configuration for holding the intermediate transfer drive gear 231, the drum drive gears 241*y*, 241*m*, 241*c*, and 241*k* are also held by similar configurations.

The pressure member 262 axially presses the intermediate transfer driving coupling 232 and the drum driving coupling 242, which are the drive side shaft couplings, toward the roller coupling 121 and the drum coupling 220, which are the driven side shaft couplings. Therefore, the intermediate transfer drive gear 231 is axially pressed toward the roller coupling 121 by the pressing member 262. The position of the intermediate transfer drive gear 231 in the thrust direction is determined by the intermediate transfer drive coupling 232 of the intermediate transfer drive gear 231 coming into contact with the roller coupling 121. Similarly, each of the drum drive gears 241 is axially pressed toward each of the drum couplings 220 by each of the pressure members 262. The position of each of the drum drive gears 241 in the thrust direction is also determined by each of the drum drive couplings 242 of each of the drum drive gears 241 coming into contact with each of the drum couplings 220.

<Shapes and Geometry of Couplings for Drive Gear and Drive Roller>

Next, the shapes and the geometry of the couplings of the intermediate transfer drive gear 231 and the drive roller (secondary transfer inner roller 76) will be described using FIGS. 8, 9A and 9B.

Figure 8:
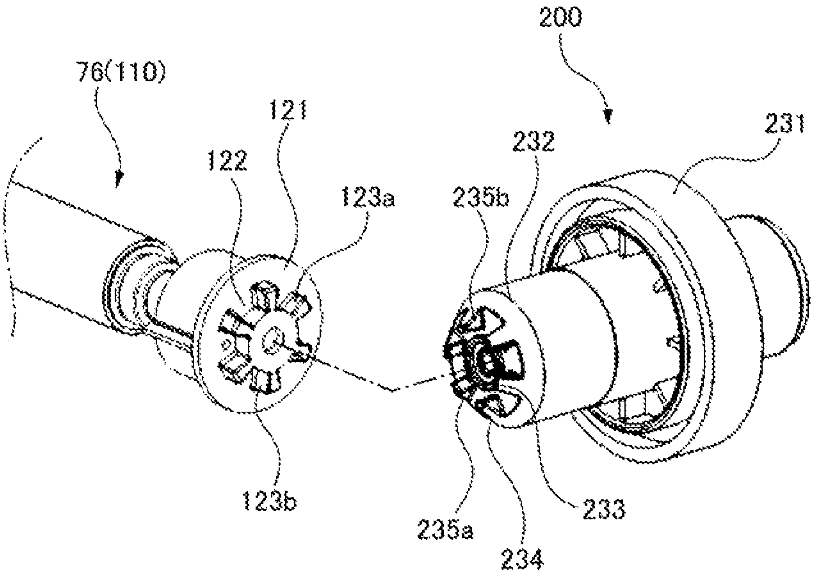
FIG. 8 is a diagram showing a perspective view of the shapes of an intermediate transfer drive coupling and a roller coupling.

FIG. 8 is a diagram showing a perspective view of the shapes of the intermediate transfer drive coupling 232 and roller coupling 121. FIG. 9A is a schematic diagram showing the forces acting on couplings 232 and 121 during forward rotation. FIG. 9B is a schematic diagram showing the forces acting on the couplings 232 and 121 during reverse rotation. The axial direction shown in FIGS. 9A and 9B is the same as the front-back direction of the image forming apparatus 100.

As shown in FIG. 8, the roller coupling 121, which is a driven side shaft coupling of the intermediate transfer unit 110, has a plurality of the recessed portions 122 in the rotational direction. The recessed portions 122 are recessed in the axial direction. In this embodiment, the roller coupling 121 has six recessed portions 122. Each of the recessed portions 122 has the first receiving surface 123*a* on one surface and the second receiving surface 123*b* on the other surface. The one surface and the other surface are opposed to each other in the rotational direction of the roller coupling 121.

The first receiving surface 123*a* has a spiral-shaped receiving surface that is inclined in a direction that intersects the axial direction (thrust direction). When the intermediate transfer drive coupling 232 rotates in the first rotational direction (forward rotation), which is the rotational direction during image formation, the first receiving surface 123*a* receives a rotational force in the first rotational direction from the intermediate transfer drive coupling 232.

Similar to the first receiving surface 123*a*, the second receiving surface 123*b* has a spiral-shaped receiving surface that is inclined in a direction that intersects the axial direction (thrust direction). When the intermediate transfer drive coupling 232 rotates in the second rotational direction (reverse rotation), which is the direction opposite to the first rotational direction, the second receiving surface 123*b* receives a rotational force in the second rotational direction from the intermediate transfer drive coupling 232.

The intermediate transfer drive coupling 232, which is a drive side shaft coupling that the drive unit 200 has, has the plurality of protruding portions 233 in the rotational direction. The protruding portions 233 protrude in the axial direction and engage the recessed portions 122, respectively. In this embodiment, the intermediate transfer drive coupling 232 has the six protruding portions 233. Each of the protruding portions 233 has the first transmitting surface 235*a* and the second transmitting surface 235*b*. The first transmitting surface 235*a* is located on the one surface of the each of the protruding portions 233 that is opposed to the first receiving surface 123*a* in the rotational direction of the intermediate transfer coupling 232. The second transmitting surface 235*b* is located on the other surface of the each of the protruding portions 233 that is opposed to the second receiving surface 123*b* in the rotational direction.

The first transmitting surface 235*a* has a spiral-shaped transmitting surface inclined in a direction that intersects the axial direction (thrust direction). This spiral-shaped transmission surface contacts the first receiving surface 123*a* when the intermediate transfer drive coupling 232 rotates in the first rotational direction and a force is exerted on the spiral-shaped transmitting surface in the axial direction contacting the first receiving surface 123*a*. The first transmitting surface 235*a* contacts the first receiving surface 123*a* when the intermediate transfer drive coupling 232 rotates in the first rotational direction to provide a rotational force in the first rotational direction to the roller coupling 121.

Similar to the first transmitting surface 235*a*, the second transmitting surface 235*b* has a spiral-shaped transmitting surface inclined in a direction that intersects the axial direction (thrust direction). When the intermediate transfer drive coupling 232 rotates in the second rotational direction, the spiral-shaped transmitting surface of the second transmitting surface 235*b* contacts the second receiving surface 123*b* and a force is exerted on the spiral-shaped transmitting surface in the axial direction separating away from the second receiving surface 123*b*. When the intermediate transfer drive coupling 232 rotates in the second rotational direction, the second transmitting surface 235*b* contacts the second receiving surface 123*b* to provide a rotational force in the second rotational direction to the roller coupling 121.

To engage the intermediate transfer drive coupling 232, which is retracted by the insertion and removal of the intermediate transfer unit 110, with the roller coupling 121, the intermediate transfer drive gear 231 is pressured axially toward the roller coupling 121 by the pressure member 262.

The intermediate transfer drive coupling 232 has the tapered portion 234 formed on the outer circumference of the end portion at the front side such that the diameter of the tapered portion 234 is enlarged from the front side to the back side in the axial direction (thrust direction). When an operator removes the intermediate transfer unit 110 from the image forming apparatus 100, the release member 150 is operated at first such that the release portion 151 of the release member 150 contacts the tapered portion 334 of the intermediate transfer drive coupling 232 to retract the intermediate transfer drive gear 231 in the thrust direction.

During forward rotation of the intermediate transfer drive gear 231, the first transmitting surface 235*a* of the intermediate transfer drive coupling 232 contacts the first receiving surface 123*a* of the roller coupling 121. As a result, a driving force in the first rotational direction is transmitted from the intermediate transfer drive coupling 232 to the roller coupling 121.

Figure 9B:
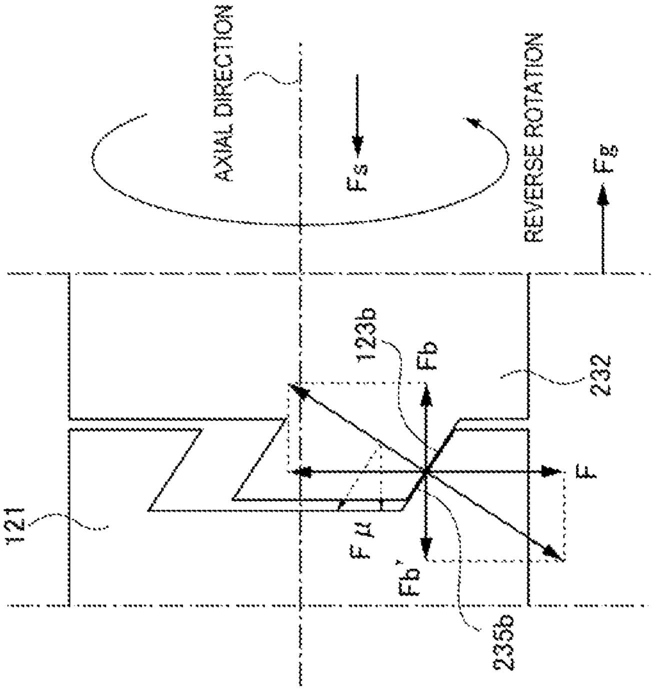
FIG. 9A is a schematic diagram showing a force acting on a coupling during the forward rotation and FIG. 9B is a schematic diagram showing a force acting on the coupling during the reverse rotation.
Figure 9A:
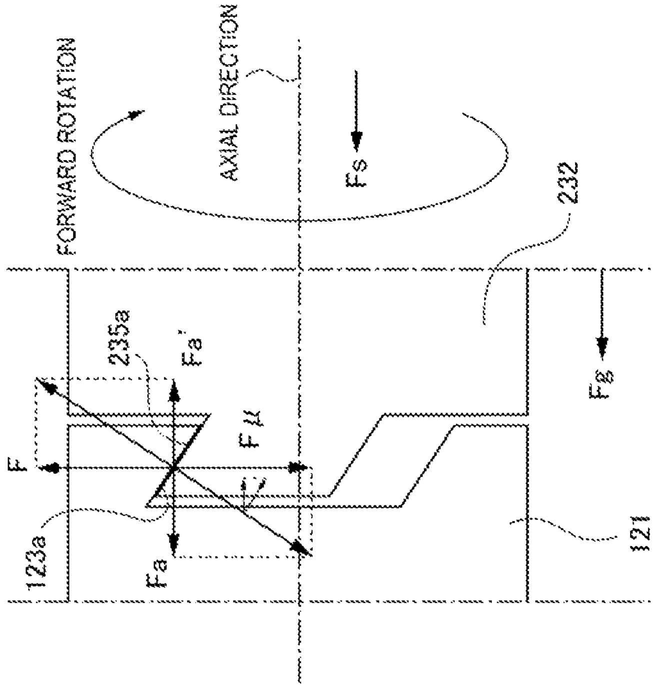

As shown in FIG. 9A, during forward rotation, the first receiving surface 123*a* of the roller coupling 121 receives a vertical driving force from the first transmitting surface 235*a* of the intermediate transfer drive coupling 232. The first receiving surface 123*a* of the roller coupling 121 has an inclined spiral shape as described above. Therefore, the rotational force F and the drawing force Fa' act on the first receiving surface 123*a* of the roller coupling 121 as a component force of the vertical driving force. The drawing force Fa, which is the reactive force of the drawing force Fa' acts on the first transmitting surface 235*a* of the intermediate transfer drive coupling 232. These drawing forces Fa' and Fa acts on the first transmitting surface 235*a* and the first receiving surface 123*a* to draw them to each other (in the contacting direction). Therefore, the intermediary transfer drive coupling 232 and the roller coupling 121 have a strong drive coupling in the thrust direction. As a result, the driving force can be stably transmitted from the drive unit 200 to the drive roller (secondary transfer inner roller 76).

On the other hand, the second transmitting surface 235*b* of the intermediate transfer drive coupling 232 contacts the second receiving surface 123*b* of the roller coupling 121 during the reverse rotation of the intermediate transfer drive gear 231. As a result, the driving force in the second rotational direction is transmitted from the intermediate transfer drive coupling 232 to the roller coupling 121.

As shown in FIG. 9B, during reverse rotation, the second receiving surface 123*b* of the roller coupling 121 receives a vertical driving force from the second transmitting surface 235*b* of the intermediate transfer drive coupling 332. The second receiving surface 123*b* of the roller coupling 121 has an inclined spiral shape substantially parallel to the first receiving surface 123*a*. This inclined spiral shape is formed by the undercut process during the resin injection molding. Therefore, the rotational force F and the coupling separation force Fb' act on the second receiving surface 123*b* of the roller coupling 121 as a component force of the vertical driving force. The coupling separation force Fb, which is the reactive force of the coupling separation force Fb' acts on the second transmitting surface 235*b* of the intermediate transfer drive coupling 232. These coupling separation forces Fb' and Fb act on the roller coupling 121 and the intermediate transfer drive coupling 232 to push them away from each other in the thrust direction.

Next, a force acting on the intermediate transfer drive gear during reverse rotation will be described using a graph shown in FIG. 10. The horizontal axis of the graph indicates an on-axis torque (torque on the drive roller axis) of the secondary transfer inner roller 76, which is a drive roller of the intermediate transfer belt 8. The vertical axis of the graph indicates a thrust force acting on the intermediate transfer drive gear 231.

Figure 10:
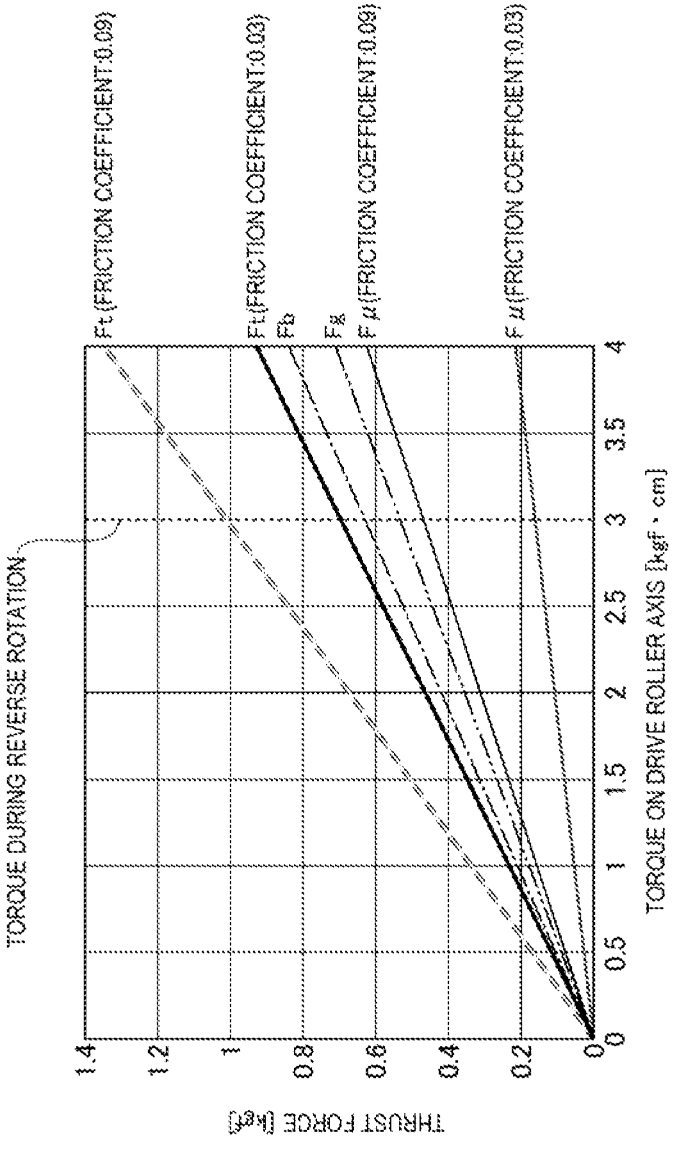
FIG. 10 is a diagram showing the relationship between a torque on an axis of a drive roller and a thrust force acting on an intermediate transfer drive gear.

As shown in FIG. 10, when the torque on the drive roller shaft increases, the driving force during reverse rotation shown in FIG. 9B also increases. As a result, the coupling separation force Fb, which is a component force of the driving force also increases. As mentioned above, the twisting direction of the intermediate transfer drive gear 231, which is formed integrally with the intermediate transfer drive coupling 232, is left. As a result, the helical thrust force Fg is generated in the direction shown in FIG. 9B on the intermediate transfer drive gear 231, which is a driven gear. Similar to the coupling separation force Fb, the helical thrust force Fg also increases as the torque on the drive roller axis increases. The frictional force Fμ acts on the second receiving surface 123*b* to resist these forces in response to the driving force. The separation force Ft(=Fb+Fg−Fμ), which is a resultant force of these forces, acts between the second transmitting surface 235*b* and the second receiving surface 123*b*. By making the pressing force Fs by the pressing member 262 larger than the separating force Ft acting between the second transmitting surface 235*b* and the second receiving surface 123*b*, the driving force (rotational force F) can be transmitted during reverse rotation. However, when the pressing force Fs by the pressure member 262 increases, the operability at the time of insertion and removal of the intermediate transfer unit 110 deteriorates. In addition, there is a possibility that the parts inside the intermediate transfer unit 110 that receive the pressing force Fs are worn or abrased.

Therefore, this embodiment is so configured that the second transmitting surface 235*b* and the second receiving surface 123*b*, which contact each other during reverse rotation are rougher than the first transmitting surface 235*a* and the first receiving surface 123*a*, which contact during forward rotation so that the friction force Fμ is increased and the separation force Ft is reduced. With the configuration that the second transmitting surface 235*b* and the second receiving surface 123*b* are rougher than the first transmitting surface 235*a* and the first receiving surface 123*a*, the friction force Fμ increases and the separation force Ft becomes less than the pressing force Fs (Ft<Fs).

In this embodiment, the torque on the drive roller shaft during reverse rotation is 3 kgf·cm. The surface roughness Ra of the first transmitting surface 235*a* and the first receiving surface 123*a*, which are in contact during forward rotation, is 0.8, and the friction coefficient is about 0.03. These parameters are selected to prevent wear and abrasion of the first transmitting surface 235*a* and the first receiving surface 123*a* due to image forming operations over a long period of time. When the surface roughness of the second transmitting surface 235*b* and the second receiving surface 123*b*, which contact each other in reverse rotation is Ra 0.8, the separation force Ft is 1.0 kgf, so the pressing force Fs must be 1.0 kgf or higher.

On the other hand, in this embodiment, the second transmitting surface 235*b* and the second receiving surface 123*b* are configured to be rougher than the first transmitting surface 235*a* and the first receiving surface 123*a* as described below. Namely, the second transmitting surface 235*b* and the second receiving surface 123*b* are configured to have a wrinkle pattern (grained shape) by emboss processing. For example, a wrinkle pattern is applied by injection molding using an injection mold with a wrinkle pattern on the corresponding surfaces of the second transmitting surface 235*b* and the second receiving surface 123*b*.

In this embodiment, the surface roughness Ra of the second transmitting surface 235*b* and the second receiving surface 123*b* with the grained shape is more than and the friction coefficient is about 0.09. As a result, the separation force Ft acting between the second transmitting surface 235*b* and the second receiving surface 123*b* is 0.69 kgf, so the pressing force Fs can be reduced to about 0.7 kgf. Since the reverse rotation is performed only in the post-rotation process, the time period when the second transmitting surface 235*b* and the second receiving surface 123*b* contact each other is much shorter than that of the first transmitting surface 235*a* and first receiving surface 123*a*, which contact each other during forward rotation, so there is less concern about wear and abrasion in reverse rotation.

In this embodiment, both the second transmitting surface 235*b* and the second receiving surface 123*b*, which contact each other in reverse rotation are rougher than the first transmitting surface 235*a* and the first receiving surface 123*a*, which contact each other in forward rotation, but the present invention is not limited to this configuration. The similar effect can be obtained when either the second transmitting surface 235*b* or the second receiving surface 123*b* is rougher than the first transmitting surface 235*a* or the first receiving surface 123*a*.

<Shapes and Geometry of Couplings for Drum Drive Gear and Photosensitive Drum>

Figure 11:
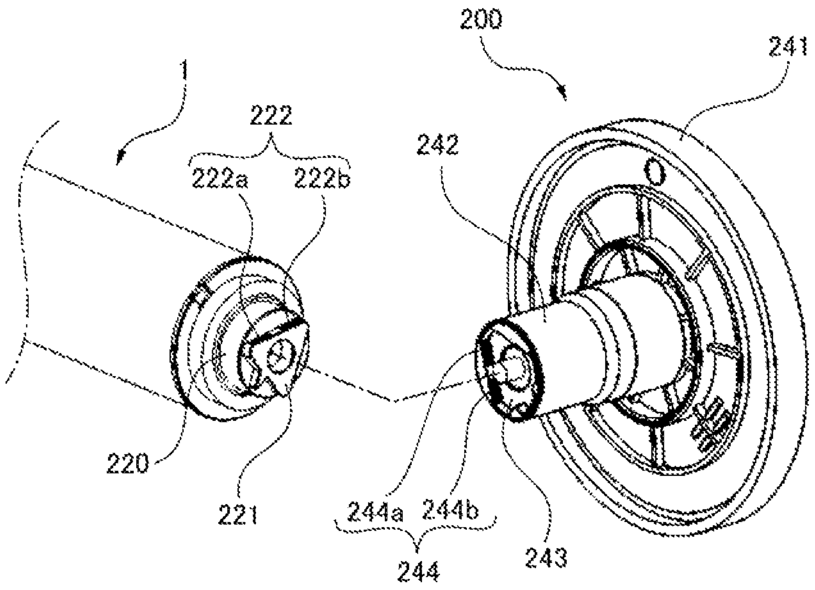
FIG. 11 is a diagram showing a perspective view of the shapes of a drum drive coupling and a drum coupling.

Next, the shapes of the couplings for the drum drive gear 241 and photosensitive drum 1 will be described using FIG. 11. FIG. 11 is a diagram showing the shapes of the drum drive coupling 242 and the drum coupling 220. Although the drum drive couplings 242 and the drum couplings 220 are provided for respective colors, they have the same configuration except for the different colors of toner, so they will be described below using reference characters without the suffixes y, m, c and k, which identify the colors.

As shown in FIG. 11, the photosensitive drum 1 has the drum coupling 220, which is a driven side shaft coupling. The drum coupling 220 has the protruding portion 221. The protruding portion 221 protrudes in the axial direction and has the receiving surfaces 222 that receives the rotational force of the drum drive coupling 242. The protruding portion 221 is formed in a polygonal shape in a sectional view by the receiving surfaces 222 such that vertices of the polygonal shape are arranged in the rotational direction. In the present embodiment, the protruding portion 221 is formed as a triangular prism. This triangular prism is formed in a triangle shape in a sectional view by the three receiving surfaces 222 such that its vertices are arranged in the rotational direction. Each of the three receiving surfaces 222 has the first receiving surface 222*a* and the second receiving surface 222*b*.

The first receiving surface 222*a* has a spiral-shaped receiving surface that is inclined in a direction that intersects the axial direction (thrust direction). When the drum drive coupling 242 rotates in the first rotational direction (forward rotation), which is the rotational direction during image formation, the first receiving surface 222*a* receives a rotational force in the first rotational direction from the drum drive coupling 242.

Similar to the first transmitting surface 222*a*, the second receiving surface 222*b* has a spiral-shaped receiving surface that is inclined in a direction that intersects the axial direction (thrust direction). When the drum drive coupling 242 rotates in the second rotational direction (reverse rotation), which is the direction opposite to the first rotational direction, the second receiving surface 222*b* receives a rotational force in the second rotational direction from the drum drive coupling 242.

The drum drive coupling 242, which is a drive side shaft coupling of the drive unit 200, has the recessed portion 243 that is recessed in the axial direction. The recessed portion 243 is to engage with the protruding portion 221. The recessed portion 243 is formed in a polygonal shape in a sectional view by the transmitting surfaces 244 that provide a rotational force to the drum coupling 220 such that vertices of the polygonal shape are arranged in the rotational direction. In this embodiment, the recessed portion 243 is to engage with the protruding portion 221 that is formed as the triangular prism. The recessed portion 243 is formed in a triangular shape in a sectional view by the three transmitting surfaces 244 such that the vertices of the triangular shape is arranged in the rotational direction. Each of the transmitting surfaces 244 includes the first transmitting surface 244*a* opposed to the first receiving surface 222*a* and the second transmitting surface 244*b* opposed to the second receiving surface 222*b*.

The first transmitting surface 244*a* has a spiral-shaped transmitting surface that is inclined in a direction that intersects the axial direction (thrust direction). When the drum drive coupling 242 rotates in the first rotational direction, this spiral-shaped transmitting surface contacts the first receiving surface 222*a*. As a result, a force in the direction contacting the first receiving surface 222*a* acts on this spiral-shaped transmitting surface in the axial direction. Namely, when the drum drive coupling 242 rotates in the first rotational direction, the first transmitting surface 244*a* contacts the first receiving surface 222*a* thereby providing a rotational force in the first rotational direction to the drum coupling 220.

Similar to the first transmitting surface 244*a*, the second transmitting surface 244*b* has a spiral-shaped transmission surface inclined in a direction that intersects the axial direction (thrust direction). The second transmitting surface 244*b* has a spiral-shaped transmitting surface inclined in a direction that intersects the axial direction (thrust direction). When the drum drive coupling 242 rotates in the second rotational direction, the spiral-shaped transmitting surface contacts the second receiving surface 222*b*. As a result, a force in the axial direction separating away from the second receiving surface 222*b* acts on the spiral-shaped transmitting surface. When the drum drive coupling 242 rotates in the second rotational direction, the second transmitting surface 244*b* contacts the second receiving surface 222*b*, thereby providing a rotational force in the second rotational direction to the drum coupling 220.

To engage the drum drive coupling 342, which is retracted by the insertion and removal of the photosensitive drum 1 to the drum coupling 220, the drum drive gear 241 is pressured axially toward the drum coupling 220 by the pressure member 262.

During forward rotation of the drum drive gear 241, the first transmitting surface 244*a* of the drum drive coupling 242 contacts the first receiving surface 222*a* of the drum coupling 220. As a result, a driving force in the first rotational direction is transmitted from the drum drive coupling 242 to the drum coupling 220.

On the other hand, during reverse rotation of the drum drive gear 241, the second transmitting surface 244*b* of the drum drive coupling 242 contacts the second receiving surface 222*b* of the drum coupling 220. As a result, a driving force in the second rotational direction is transmitted from the drum drive coupling 242 to the drum coupling 220.

Similar to those of the above-described intermediate transfer drive coupling 232 and the roller coupling 121, the first transmitting surface 244*a* and the first receiving surface 222*a* have a spiral-shape so inclined that a drawing force acts on the first transmitting surface 244*a* and the first receiving surface 222*a* to draw them to each other in the thrust directions. On the other hand, the second transmitting surface 244*b* and the second receiving surface 222*b*, which contact each other during reverse rotation, have a spiral shape so inclined that a force for separating them from each other in the thrust direction acts on the second transmitting surface 244*b* and the second receiving surface 222*b* by the undercut process performed during the injection molded of resin.

As mentioned above, each of the transmitting surfaces 244 of the recessed portion 243 of the drum drive coupling 242 has the first transmitting surface 244*a* for force transmission during forward rotation and the second transmitting surface 244*b* for force transmission during reverse rotation. Each of the receiving surfaces 222 of the triangular prism-shaped protruding portion 221 of the drum coupling 220 has the first receiving surface 222*a* for force transmission during forward rotation and the second receiving surface 222*b* for force transmission during reverse rotation. Similar to those of the intermediate transfer drive coupling 232 and the roller coupling 121 described above, the second transmitting surface 244*b* and the second receiving surface 222*b*, which contact each other during reverse rotation, are rougher than the first transmitting surface 244*a* and first receiving surface 222*a*, which contact each other during forward rotation. This allows the drum drive coupling 242 and the drum coupling 220 to have the similar effect as the intermediate transfer drive coupling 232 and the roller coupling 121 described above.

In this embodiment, both the second transmitting surface 244*b* and the second receiving surface 222*b*, which contact each other in reverse rotation are rougher than the first transmitting surface 244*a* and the first receiving surface 222*a*, which contact each other in forward rotation, but the present invention is not limited to this configuration. The similar effect can be obtained when either the second transmitting surface 244*b* or the second receiving surface 222*b* is rougher than the first transmitting surface 244*a* and the first receiving surface 222*a*.

(Effects)

The above configuration enables stable transmission of drive power for both forward and reverse rotations even when a spiral-shaped coupling with an inclined transmission surface (receiving surface) is used for the drive gears of the intermediate transfer unit 110 and the photosensitive drum 1, which can be inserted and removed from the image forming apparatus. Namely, according to this embodiment, the drive force can be stably transmitted from the drive unit 200 to the photosensitive drum 1, which is a rotating member, and the secondary transfer inner roller 76, which is a drive roller of the intermediate transfer belt 8, even when the shaft couplings rotate in which forces act in directions separating away from each other.

The present invention is not limited to the above configurations and the following configurations can be also adopted.

In the above-described first embodiment, the configuration is exemplified in which the protruding portion 233 is provided on the drive roller side of the intermediate transfer belt 8 and the recessed portion 122 that engages the protruding portion 233 is provided on the drive unit 200 side. However, the present invention is not limited to this configuration. The configuration may be adopted in which the recessed portion is provided on the drive roller side of the intermediate transfer belt and the protruding portion that engages the recessed portion is provided on the drive unit side.

In the above-described second embodiment, the configuration is exemplified in which the recessed portion 243 is provided on the photosensitive drum 1 side and the protruding portion 221 that engages with the recessed portion 243 is provided on the drive unit 200 side. However, the present invention is not limited to this configuration. The configuration may be adopted in which the protruding portion is provided on the photosensitive drum side and the recessed portion that engages with the protruding portion is provided on the drive unit side.

In the above-described embodiments, the photosensitive drum 1 and the drive roller (the secondary transfer inner roller 76) of the intermediate transfer belt 8 are exemplified as rotational members that have a driven side shaft coupling and are detachably attachable to the image forming apparatus. However, the present invention is not limited to this configuration. For example, such a rotating member can the developing roller 42 in the configuration in which the developing device 4 is detachably attachable to the image forming apparatus.

With these configurations, as in the present embodiment described above, a driving force can be stably transmitted from the drive unit 200 to the photosensitive drum 1, which is a rotating member, and the secondary transfer inner roller 76, which is a drive roller of the intermediate transfer belt 8, even when shaft couplings rotate in which forces act in directions separating away from each other.

In the above-described embodiments, a printer is exemplified as an image forming apparatus. However, the present invention is not limited to this configuration. The present invention may also be applied to another image forming apparatus such as a copying machine, a facsimile, or another image forming apparatus such as a multifunctional machine that combine functions of these apparatuses. An image forming apparatus is illustrated above in which an intermediate transfer member is used, toner images of each color are transferred so as to be sequentially superimposed on the intermediate transfer member, and the toner images bore on the intermediate transfer member are transferred to the recording material at a time. However, the present invention is not limited to this configuration. The present invention may be applied to an image forming apparatus in which a recording material bearing member is used, and toner images of each color are transferred so as to be sequentially superimposed on the recording material bore on the recording material bearing member. The similar effect may be obtained by applying the present invention to the drive unit in these image forming apparatuses.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-126125, filed Aug. 8, 2022, which is hereby incorporated by reference herein in its entirety.

What is claimed is:

1. An image forming apparatus comprising:

a detachably attachable unit that is detachably attachable to the image forming apparatus, the detachably attachable unit including a rotating member with a driven side shaft coupling; and a drive unit having a drive side shaft coupling to engage with the driven side shaft coupling, the drive unit being configured to provide a driving force to the rotating member via the drive side shaft coupling, wherein the driven side shaft coupling includes:

a first receiving surface in a spiral shape inclined in a direction that intersects an axial direction, the first receiving surface being configured to receive a rotating force in a first rotational direction from the drive side shaft coupling when the drive side shaft coupling rotates in the first rotational direction, the first rotational direction being a rotational direction during image formation; and a second receiving surface in a spiral shape inclined in a direction that intersects an axial direction, the second receiving surface being configured to receive a rotating force in a second rotational direction from the drive side shaft coupling when the drive side shaft coupling rotates in the second rotational direction, the second rotational direction being opposite the first rotational direction, wherein the drive side shaft coupling includes:

a first transmitting surface in a spiral shape inclined in a direction that intersects an axial direction, the first transmitting surface being configured to contact the first receiving surface, to provide a rotational force in the first rotational direction to the driven side shaft coupling, and to receive a force in an axial direction contacting the first receiving surface when the drive side shaft coupling rotates in the first rotating direction; and a second transmitting surface in a spiral shape inclined in a direction that intersects an axial direction, the second transmitting surface being configured to contact the second receiving surface, to provide a rotational force in the second rotational direction to the driven side shaft coupling, and to receive a force in an axial direction separating from the second receiving surface when the drive side shaft coupling rotates in the second rotating direction, and wherein the second transmitting surface and the second receiving surface are rougher than the first transmitting surface and the first receiving surface.

2. The image forming apparatus according to claim 1, wherein at least one of the driven side shaft coupling or the drive side shaft coupling is molded using an injection molding die.

3. The image forming apparatus according to claim 1, wherein:

the driven side shaft coupling includes a plurality of recessed portions in a rotational direction of the driven side shaft coupling, each of the recessed portions being recessed in an axial direction, the first receiving surface and the second receiving surface are located on each of the recessed portions such that the first receiving surface and the second receiving surface are opposed to each other in the rotational direction of the driven side shaft coupling, the drive side shaft coupling includes a plurality of protruding portions in a rotational direction of the drive side shaft coupling, each of the protruding portions protruding in an axial direction and being to engage with each of the recessed portions, and the first transmitting surface and the second transmitting surface are located on each of the protruding portions such that the first transmitting surface is opposed to the first receiving surface in the rotational direction of the drive side shaft coupling and the second transmitting surface is opposed to the second receiving surface in the rotational direction of the drive side shaft coupling.

4. The image forming apparatus according to claim 1, wherein:

the driven side shaft coupling includes a plurality of protruding portions in a rotational direction of the driven side shaft coupling, each of the protruding portions protruding in an axial direction, the first receiving surface and the second receiving surface are located on each of the protruding portions such that the first receiving surface and the second receiving surface are opposed to each other in the rotational direction of the driven side shaft coupling, the drive side shaft coupling includes a plurality of recessed portions in a rotational direction of the drive side shaft coupling, each of the recessed portions being recessed in an axial direction, and the first transmitting surface and the second transmitting surface are located on each of the recessed portions such that the first transmitting surface is opposed to the first receiving surface in the rotational direction of the drive side shaft coupling and the second transmitting surface is opposed to the second receiving surface in the rotational direction of the drive side shaft coupling.

5. The image forming apparatus according to claim 1, wherein:

the driven side shaft coupling includes a protruding portion that protrudes in an axial direction, the protruding portion being formed in a polygonal shape in a rotating direction by receiving surfaces that receive a rotational force of the drive side shaft coupling, the first receiving surface and the second receiving surface are located on each of the receiving surfaces of the protruding portion, the drive side shaft coupling includes a recessed portion to engage with the protruding portion, the recessed portion being recessed in an axial direction and formed in a polygonal shape in a rotational direction by transmitting surfaces that provide a rotational force to the driven side shaft coupling, and the first transmitting surface and the second transmitting surface are located on each of the transmitting surfaces such that the first transmitting surface is opposed to the first receiving surface and the second transmitting surface is opposed to the second receiving surface.

6. The image forming apparatus according to claim 1, wherein:

the driven side shaft coupling includes a recessed portion that is recessed in an axial direction and formed in a polygonal shape in a rotational direction by receiving surfaces that receive a rotational force of the drive side shaft coupling, the first receiving surface and the second receiving surface are located on each of the receiving surfaces of the recessed portion, the drive side shaft coupling includes a protruding portion to engage the recessed portion, the protruding portion protruding in an axial direction and formed in a polygonal shape in a rotational direction by transmitting surfaces that provide a rotational force to the driven side shaft coupling, and the first transmitting surface and the second transmitting surface are located on each of the transmitting surfaces such that the first transmitting surface is opposed to the first receiving surface and the second transmitting surface is opposed to the second receiving surface.

7. The image forming apparatus according to claim 1, further comprising a pressure member that pressurizes the drive side shaft coupling in an axial direction toward the driven side shaft coupling.

8. The image forming apparatus according to claim 7, wherein an outer circumference of an end portion of the drive side shaft coupling is tapered, where a diameter of the taper changes along an axial direction.

9. The image forming apparatus according to claim 1, wherein:

the detachably attachable unit includes an intermediate transfer member stretched by a plurality of rollers, the detachably attachable unit being able to be attached to the image forming apparatus and detached from the image forming apparatus in a direction orthogonal to an axial direction, the rotating member is one of the plurality of rollers and is a drive roller that drives the intermediate transfer member, and the driven side shaft coupling is located on an axial end portion of the drive roller.

10. The image forming apparatus according to claim 1, wherein:

the detachably attachable unit includes an image bearing member as the rotating member, the detachably attachable unit being able to be attached to the image forming apparatus and detached from the image forming apparatus in an axial direction, and the driven side shaft coupling is located on an axial end portion of the image bearing member.

* * * * *